(12) United States Patent
Suzuki et al.

(10) Patent No.: US 10,309,332 B2
(45) Date of Patent: Jun. 4, 2019

(54) EXHAUST GAS PURIFICATION SYSTEM FOR INTERNAL COMBUSTION ENGINE

(71) Applicant: Toyota Jidosha Kabushiki Kaisha, Toyota-shi, Aichi-ken (JP)

(72) Inventors: Kazuya Suzuki, Susono (JP); Koichi Hoshi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 13 days.

(21) Appl. No.: 15/496,317

(22) Filed: Apr. 25, 2017

(65) Prior Publication Data
US 2017/0314496 A1     Nov. 2, 2017

(30) Foreign Application Priority Data
Apr. 28, 2016   (JP) .................. 2016-091234

(51) Int. Cl.
*F01N 3/00* (2006.01)
*F02D 41/26* (2006.01)
(Continued)

(52) U.S. Cl.
CPC ........... *F02D 41/263* (2013.01); *F01N 3/101* (2013.01); *F01N 9/00* (2013.01); *F01N 11/007* (2013.01); *F01N 13/008* (2013.01); *F02D 41/008* (2013.01); *F02D 41/1439* (2013.01); *F02D 41/1454* (2013.01); *F02D 41/1473* (2013.01); *F01N 2430/06* (2013.01); *F01N 2560/025* (2013.01); *F02D 41/0295* (2013.01); *Y02T 10/22* (2013.01); *Y02T 10/47* (2013.01)

(58) Field of Classification Search
CPC .. F01N 11/007; F01N 13/008; F01N 2430/06; F01N 2560/025; F01N 3/101; F01N 9/00; F02D 41/008; F02D 41/0295; F02D 41/1439; F02D 41/1454; F02D 41/1473; F02D 41/263
See application file for complete search history.

(56) References Cited

U.S. PATENT DOCUMENTS

2012/0323466 A1 * 12/2012 Iwazaki .............. F02D 41/0085
                                                                701/104
2013/0138329 A1 *  5/2013 Aoki .................... F02D 41/0085
                                                                701/104
(Continued)

FOREIGN PATENT DOCUMENTS

| JP | 2001-050082 A | 2/2001 |
| JP | 2004-225559 A | 8/2004 |
| JP | 2013-204511 A | 10/2013 |

*Primary Examiner* — Audrey K Bradley
*Assistant Examiner* — Anthony Ayala Delgado
(74) *Attorney, Agent, or Firm* — Dinsmore & Shohl LLP

(57) ABSTRACT

When the air fuel ratio dither control is carried out, an air fuel ratio of a mixture in each of one or more lean cylinders and one or more rich cylinders is controlled in a feedback manner based on an average value of a detected value of an air fuel ratio sensor, so that an average value of an air fuel ratio of exhaust gas flowing into the three-way catalyst becomes a predetermined target exhaust gas air fuel ratio. At this time, the air fuel ratio dither control is carried out, by setting at least a cylinder with the highest gas impingement intensity in a cylinder group of an internal combustion engine as the one or more lean cylinders.

5 Claims, 8 Drawing Sheets

(51) Int. Cl.
*F01N 3/10* (2006.01)
*F01N 11/00* (2006.01)
*F01N 13/00* (2010.01)
*F01N 9/00* (2006.01)
*F02D 41/00* (2006.01)
*F02D 41/14* (2006.01)
F02D 41/02 (2006.01)

(56) References Cited

U.S. PATENT DOCUMENTS

2013/0179051 A1* 7/2013 Tomimatsu ............. F02D 17/02
701/104
2013/0261936 A1 10/2013 Suzuki

* cited by examiner

[Fig. 1]
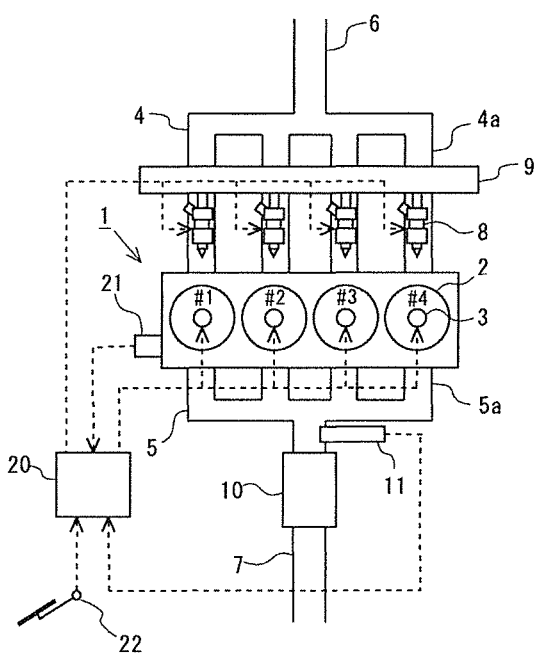

[Fig. 2]
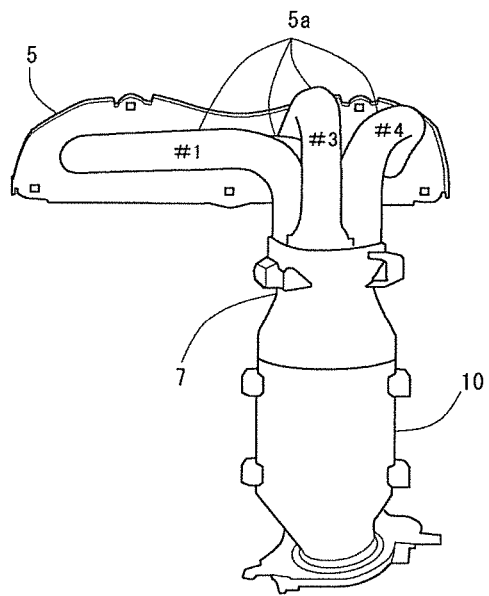
[Fig. 3]
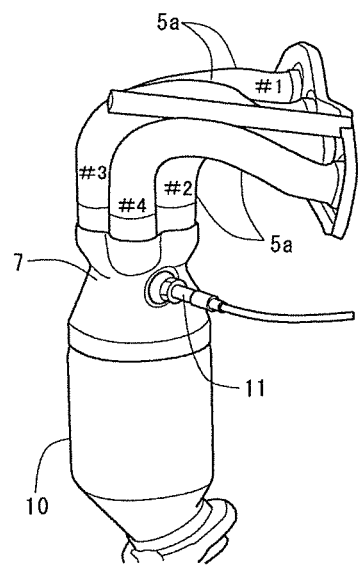

[Fig. 4]
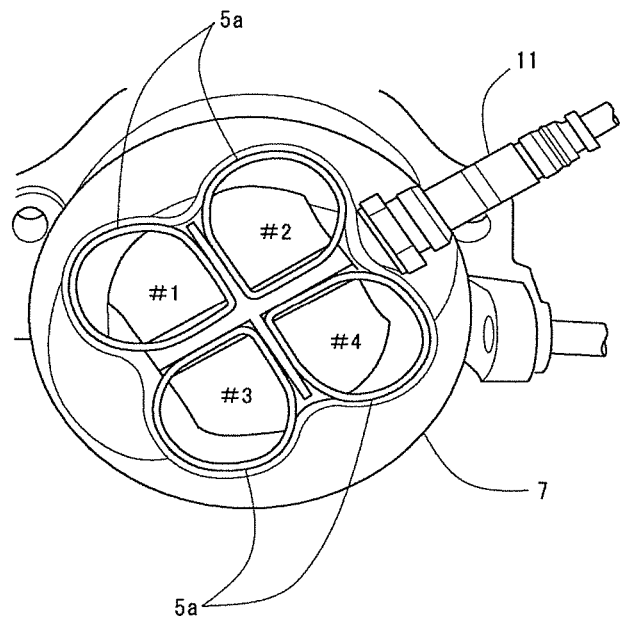
[Fig. 5]
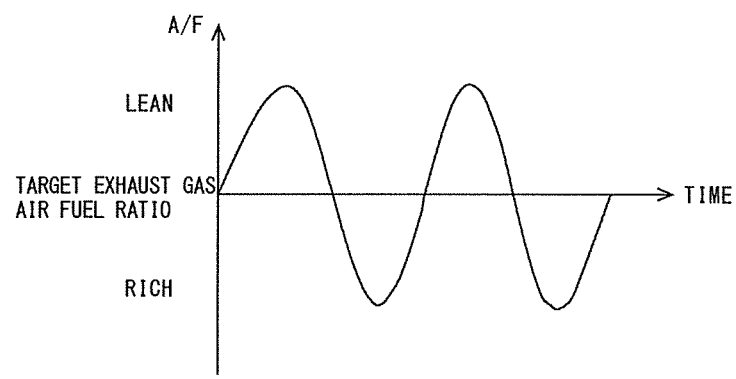

[Fig. 6]
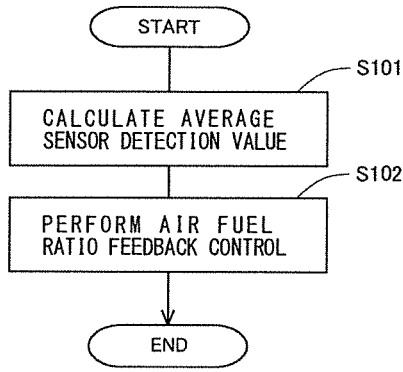
[Fig. 7]
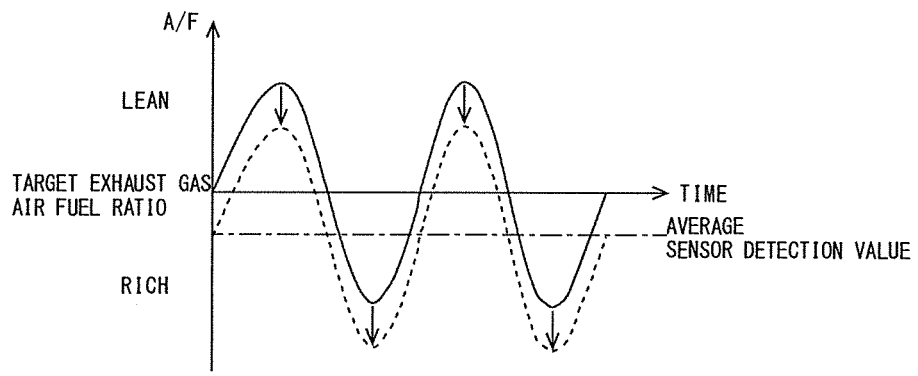
[Fig. 8]
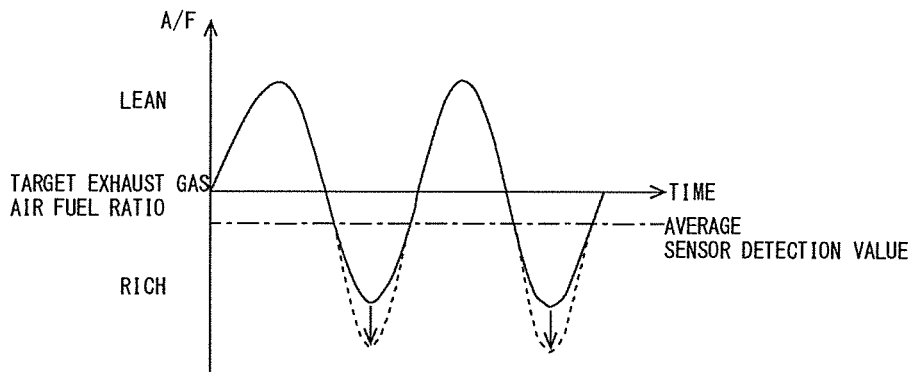

[Fig. 9]
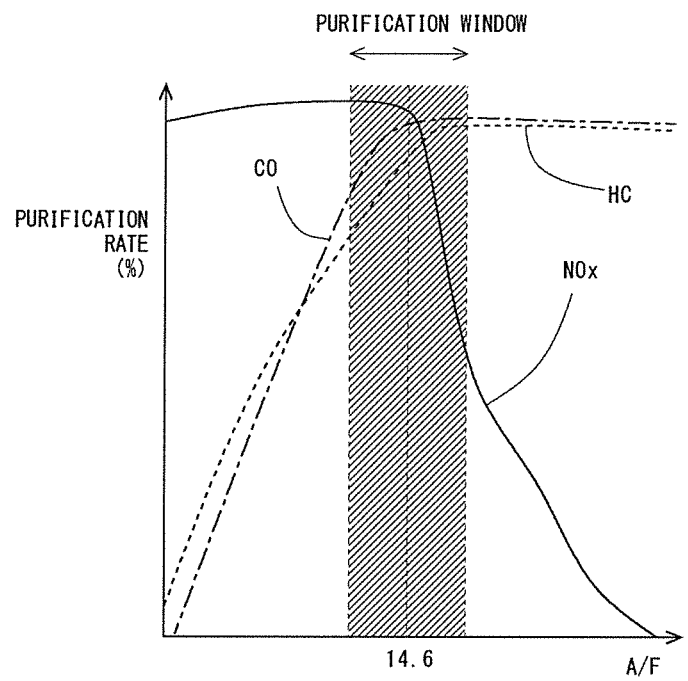
[Fig. 10]
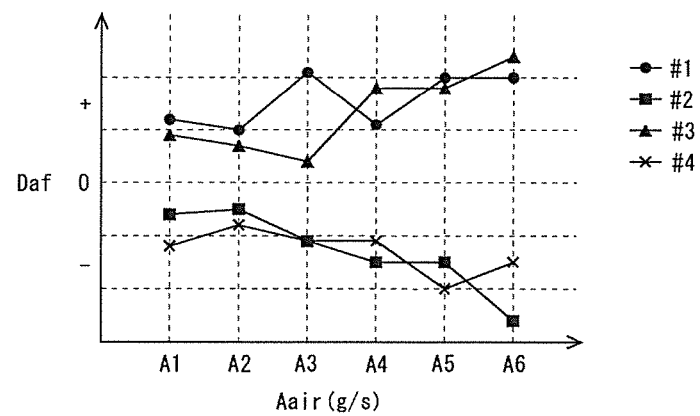

[Fig. 11]
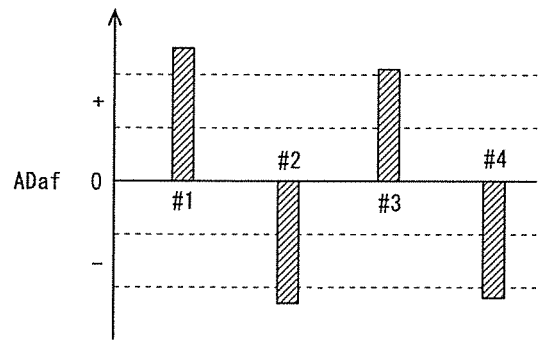
[Fig. 12]
| ORDER OF GAS IMPINGEMENT INTENSITIES | 1 | 2 | 3 | 4 |
|---|---|---|---|---|
| CYLINDER | #2 | #4 | #3 | #1 |
[Fig. 13]
ORDER OF COMBUSTION →
| CYLINDER | #1 | #3 | #4 | #2 |
|---|---|---|---|---|
| ASSIGNMENT OF LEAN CYLINDER AND RICH CYLINDER | R | L | R | L |
R:RICH CYLINDER
L:LEAN CYLINDER
[Fig. 14]
ORDER OF COMBUSTION →
| CYLINDER | #1 | #3 | #4 | #2 |
|---|---|---|---|---|
| ASSIGNMENT OF LEAN CYLINDER AND RICH CYLINDER | R | R | R | L |
R:RICH CYLINDER
L:LEAN CYLINDER

[Fig. 15]
ORDER OF COMBUSTION →
| CYLINDER | #1 | #3 | #4 | #2 |
|---|---|---|---|---|
| ASSIGNMENT OF LEAN CYLINDER AND RICH CYLINDER | R | R | L | L |
R: RICH CYLINDER
L: LEAN CYLINDER
[Fig. 16]
ORDER OF COMBUSTION →
| CYLINDER | #1 | #3 | #4 | #2 |
|---|---|---|---|---|
| ASSIGNMENT OF LEAN CYLINDER AND RICH CYLINDER | R | L | L | L |
R: RICH CYLINDER
L: LEAN CYLINDER
[Fig. 17]
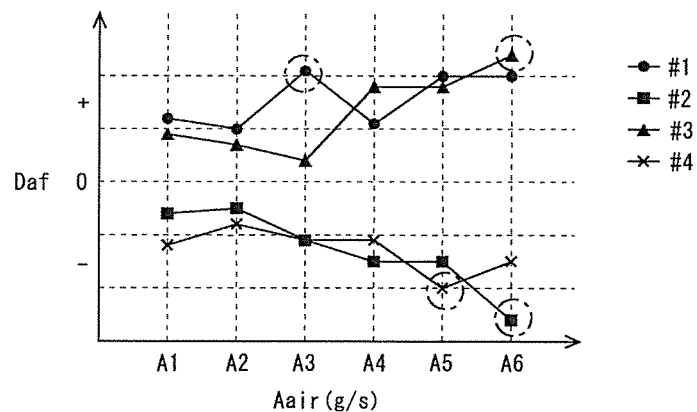
[Fig. 18]
| ORDER OF GAS IMPINGEMENT INTENSITIES | 1 | 2 | 3 | 4 |
|---|---|---|---|---|
| CYLINDER | #2 | #4 | #1 | #3 |

[Fig. 19]
| CYLINDER | #1 | #3 | #4 | #2 |
|---|---|---|---|---|
| ASSIGNMENT OF LEAN CYLINDER AND RICH CYLINDER | L | R | L | L |
ORDER OF COMBUSTION →
R:RICH CYLINDER
L:LEAN CYLINDER
[Fig. 20]
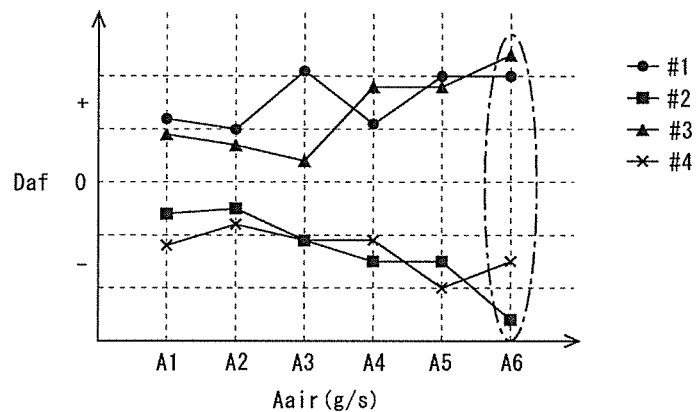
[Fig. 21]
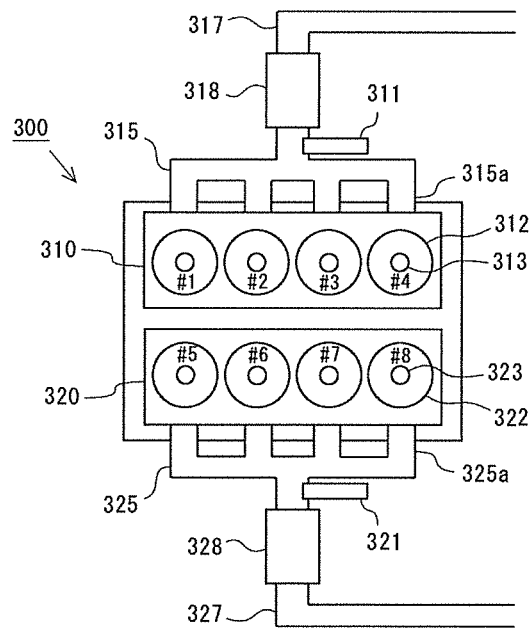

EXHAUST GAS PURIFICATION SYSTEM FOR INTERNAL COMBUSTION ENGINE

CROSS-REFERENCE TO RELATED APPLICATIONS

This application claims the benefit of Japanese Patent Application No. 2016-091234, filed Apr. 28, 2016, which is incorporated by reference herein in its entirety.

BACKGROUND

Technical Field

The present disclosure relates to an exhaust gas purification system for an internal combustion engine.

Description of the Related Art

In the past, there has been known a technology in which in an exhaust gas purification system for an internal combustion engine comprising a three-way catalyst arranged in an exhaust passage, air fuel ratio dither control is carried out in order to raise the temperature of the three-way catalyst. In the air fuel ratio dither control, the air fuel ratio of a mixture in a part of cylinders may be controlled to a lean air fuel ratio which is leaner than a stoichiometric air fuel ratio, and the air fuel ratio of a mixture in a part of the remaining cylinders may be controlled to a rich air fuel ratio which is richer than the stoichiometric air fuel ratio. Hereinafter, in such air fuel ratio dither control, that cylinder in which the air fuel ratio of a mixture is controlled to a lean air fuel ratio is referred to as "lean cylinder". In addition, in such air fuel ratio dither control, that cylinder in which the air fuel ratio of a mixture is controlled to a rich air fuel ratio is referred to as "rich cylinder". Moreover, in the air fuel ratio dither control, the air fuel ratio of a mixture in each of the lean cylinder and the rich cylinder is controlled in such a manner that an average value of the air fuel ratio (hereinafter, this may be referred to as an "average exhaust gas air fuel ratio".) of the exhaust gas flowing into the three-way catalyst (hereinafter, this may be referred to as an "incoming exhaust gas".) becomes a predetermined target exhaust gas air fuel ratio.

When the air fuel ratio dither control is carried out, a period of time in which the exhaust gas discharged from the lean cylinder mainly flows into the three-way catalyst, and a period of time in which the exhaust gas discharged from the rich cylinder mainly flows into the three-way catalyst, will be repeated in an alternate manner. In other words, the exhaust gas of the lean air fuel ratio and the exhaust gas of the rich air fuel ratio will be supplied to the three-way catalyst in an alternate manner. At this time, when the exhaust gas of the lean air fuel ratio is supplied to the three-way catalyst, oxygen in the exhaust gas is held in the three-way catalyst. Then, when the exhaust gas of the rich air fuel ratio is supplied to the three-way catalyst, HC and CO in the exhaust gas are oxidized by the oxygen held in the three-way catalyst. The temperature rise of the three-way catalyst will be promoted by the heat of oxidation of HC and CO at this time. In addition, during the execution of the air fuel ratio dither control, too, not only the HC and CO are oxidized, but also NOx in the exhaust gas is reduced, in the three-way catalyst. In other words, according to the air fuel ratio dither control, the temperature rise of the three-way catalyst can be promoted, while exhibiting the HC and CO oxidation function and the NOx reduction function in the three-way catalyst.

Here, in patent literature 1, there is disclosed a technology in which in air fuel ratio dither control, the air fuel ratio of a mixture in the lean cylinder and the air fuel ratio of a mixture in the rich cylinder are controlled in a feedback manner based on a detected value of an air fuel ratio sensor which is arranged in an exhaust passage at the upstream side of a three-way catalyst.

In addition, patent literature 2 discloses that in an arrangement in which an air fuel ratio sensor is arranged in an exhaust passage at the downstream side of a merge portion of exhaust branch pipes which are connected to individual cylinders of a cylinder group including a plurality of cylinders, there occurs a case where the intensity or force of impingement of exhaust gas discharged from some of the cylinders against the air fuel ratio sensor is relatively strong, whereas the intensity of impingement of exhaust gas discharged from the other cylinders is relatively weak. Moreover, in the technology disclosed in patent literature 2, based on the air fuel ratio of a mixture in those cylinders for which the intensity of impingement of exhaust gas is relatively strong, the amount of fuel injection in the other cylinders is controlled.

CITATION LIST

Patent Literature

Patent Literature 1: Japanese Patent Application Laid-Open No. 2001-050082
Patent Literature 2: Japanese Patent Application Laid-Open No. 2004-225559

SUMMARY

As described above, in an exhaust gas purification system for an internal combustion engine comprising an air fuel ratio sensor arranged in an exhaust passage at the upstream side of a three-way catalyst, at the time of carrying out air fuel ratio dither control, the air fuel ratio of a mixture in each of the lean cylinder and the rich cylinder may be controlled in a feedback manner based on a detected value of the air fuel ratio sensor. In this case, when the exhaust gas discharged from the lean cylinder mainly passes through the air fuel ratio sensor, the detected value of the air fuel ratio sensor becomes a value higher than the stoichiometric air fuel ratio. On the other hand, when the exhaust gas discharged from the rich cylinder mainly passes through the air fuel ratio sensor, the detected value of the air fuel ratio sensor becomes a value lower than the stoichiometric air fuel ratio. Then, the air fuel ratio of the mixture in each of the lean cylinder and the rich cylinder is controlled so that an average value of the detected value of the air fuel ratio sensor (hereinafter, this may be referred to as an "average sensor detection value".) becomes the target exhaust gas air fuel ratio. As a result of this, the average exhaust gas air fuel ratio of the incoming exhaust gas will be controlled to the target exhaust gas air fuel ratio.

At this time, when the average sensor detection value is shifted to a rich side with respect to an actual average exhaust gas air fuel ratio of the incoming exhaust gas, the actual average exhaust gas air fuel ratio of the incoming exhaust gas will shift to a lean side with respect to the target exhaust gas air fuel ratio, by the air fuel ratio of the mixture in each of the lean cylinder and the rich cylinder being subjected to feedback control based on the average sensor detection value. When this amount of shift with respect to the target exhaust gas air fuel ratio of the actual average exhaust gas air fuel ratio of the incoming exhaust gas becomes large (i.e., the degree of leanness of the actual average exhaust gas air fuel ratio of the incoming exhaust gas becomes large), it becomes difficult to reduce NOx in the three-way catalyst to a sufficient extent. As a result, there is a fear that the NOx purification (reduction) rate in the three-way catalyst may decrease below an allowable range.

The present disclosure has been made in view of the above-mentioned problems, and has for its object to suppress a decrease in the NOx reduction rate in the three-way catalyst in the course of the execution of air fuel ratio dither control.

In the present disclosure, when air fuel ratio dither control is carried out based on a detected value of an air fuel ratio sensor arranged in an exhaust passage at the upstream side of a three-way catalyst, the air fuel ratio dither control is carried out, by setting at least a cylinder with the highest or largest gas impingement intensity or force in a cylinder group of an internal combustion engine as the lean cylinder.

More specifically, an exhaust gas purification system for an internal combustion engine according to the present disclosure resides in an exhaust gas purification system for an internal combustion engine comprising a cylinder group including a plurality of cylinders, the system comprising: a three-way catalyst that is arranged in an exhaust passage at the downstream side of a merge portion of exhaust branch pipes which are connected to individual cylinders of the cylinder group; an air fuel ratio sensor that is arranged in a portion in the exhaust passage at the upstream side of the three-way catalyst; and a controller comprising at least one processor configured to control an air fuel ratio of a mixture in a part of the cylinders of the cylinder group to a lean air fuel ratio leaner than a stoichiometric air fuel ratio, and control an air fuel ratio of a mixture in a part of the other cylinders of the cylinder group to a rich air fuel ratio richer than the stoichiometric air fuel ratio, and carry out air fuel ratio dither control in which the air fuel ratio of the mixture in each of one or more lean cylinders, in which the air fuel ratio of the mixture is controlled to the lean air fuel ratio, and one or more rich cylinders, in which the air fuel ratio of the mixture is controlled to the rich air fuel ratio, is controlled in a feedback manner based on an average value of a detected value of the air fuel ratio sensor, in such a manner that an average value of an air fuel ratio of exhaust gas flowing into the three-way catalyst becomes a predetermined target exhaust gas air fuel ratio; wherein the controller carries out the air fuel ratio dither control by setting, as the one or more lean cylinders, at least a cylinder, in which a gas impingement intensity, which is an intensity of impingement of exhaust gas discharged from the cylinder against the air fuel ratio sensor, is the highest, in the cylinder group.

The internal combustion engine according to the present disclosure may have cylinder groups including a plurality of cylinders. The number of the cylinder groups which the internal combustion engine has may be one or may be plural. In addition, in the arrangement according to the present disclosure, when the internal combustion engine has a plurality of cylinder groups, a three-way catalyst and an air fuel ratio sensor are arranged in each of exhaust passages corresponding to individual cylinder groups, respectively.

Here, the exhaust gas discharged from each cylinder in a cylinder group of the internal combustion engine will flow into a common exhaust passage, while passing through an exhaust branch pipe connected to that cylinder, and will pass through an air fuel ratio sensor arranged in the common exhaust passage. At this time, there may occur a case where in the cylinder group of the internal combustion engine, a gas impingement intensity, which is an intensity or force of impingement of an exhaust gas discharged from a cylinder against an air fuel ratio sensor, is relatively high (large), whereas a gas impingement intensity of an exhaust gas discharged from another cylinder is relatively low (small). In other words, in the exhaust passage, a portion thereof in which an exhaust gas discharged from a certain cylinder mainly flows is different from a portion thereof in which an exhaust gas discharged from another cylinder mainly flows. For that reason, the distribution of the exhaust gas discharged from each cylinder does not become uniform, but has a certain amount of deviation or shift for each cylinder, on a cross section of the exhaust passage (i.e., a cross section which crosses at right angles with respect to an axial direction of the exhaust passage). As a result, there will occur cylinders in which the gas impingement intensity is relatively high, and cylinders in which the gas impingement intensity is relatively low, resulting from the relation between a path in which the exhaust gas discharged from each cylinder mainly flows, and the location of arrangement of an air fuel ratio sensor in the exhaust passage.

Then, even if the actual air fuel ratio of exhaust gas discharged from each cylinder is the same, the value of the air fuel ratio of the exhaust gas detected by the air fuel ratio sensor (i.e., the detected value of the air fuel ratio sensor) may be different between when the gas impingement intensity of the exhaust gas is high, and when it is low. For that reason, at the time of carrying out air fuel ratio dither control in which the air fuel ratio of the mixture in each of the one or more lean cylinders and the one or more rich cylinders is controlled in a feedback manner based on the average sensor detection value, the actual average exhaust gas air fuel ratio of the incoming exhaust gas may shift or deviate from the target exhaust gas air fuel ratio, resulting from the nonuniformity of the gas impingement intensity for each cylinder as mentioned above. In other words, when the air fuel ratio dither control is carried out by setting, as the one or more rich cylinders, a cylinder with a relatively high gas impingement intensity, the average sensor detection value becomes easy to shift to a rich side with respect to the actual average exhaust gas air fuel ratio of the incoming exhaust gas. For that reason, when the air fuel ratio of the mixture in each of the one or more lean cylinders and the one or more rich cylinders is subjected to feedback control based on the average sensor detection value, the actual average exhaust gas air fuel ratio of the incoming exhaust gas becomes easy to shift to a lean side with respect to the target exhaust gas air fuel ratio. In that case, there is a fear of causing a decrease in the NOx removal or reduction rate in the three-way catalyst in the course of the execution of the air fuel ratio dither control.

Accordingly, in the present disclosure, the controller may carry out the air fuel ratio dither control, by setting, as the one or more lean cylinders, at least a cylinder with the highest gas impingement intensity in a cylinder group. With this, in the course of the execution of the air fuel ratio dither control, the average sensor detection value becomes difficult to shift to a rich side with respect to the actual average exhaust gas air fuel ratio of the incoming exhaust gas. For that reason, when the air fuel ratio of the mixture in each of the one or more lean cylinders and the one or more rich cylinders is subjected to feedback control based on the average sensor detection value, the actual average exhaust gas air fuel ratio of the incoming exhaust gas becomes difficult to shift to a lean side with respect to the target exhaust gas air fuel ratio. Accordingly, according to the present disclosure, it is possible to suppress the decrease of the NOx removal or reduction rate in the three-way catalyst in the course of the execution of the air fuel ratio dither control.

Here, note that when the air fuel ratio dither control is carried out by setting, as the one or more lean cylinders, a cylinder with a relatively high gas impingement intensity, the average sensor detection value may become easy to shift to a lean side with respect to the actual average exhaust gas air fuel ratio of the incoming exhaust gas, contrary to the case where the air fuel ratio dither control is carried out by setting, as the one or more rich cylinders, a cylinder with a relatively high gas impingement intensity. In this case, when the air fuel ratio of the mixture in each of the one or more lean cylinders and the one or more rich cylinders is subjected to feedback control based on the average sensor detection value, the actual average exhaust gas air fuel ratio of the incoming exhaust gas becomes easy to shift to a rich side with respect to the target exhaust gas air fuel ratio. However, the degree of decrease in each of the HC and CO purification (removal or oxidation) rates in the three-way catalyst in the case where the air fuel ratio of the incoming exhaust gas has shifted to the rich side with respect to the stoichiometric air fuel ratio is smaller than the degree of decrease in the NOx purification (removal or reduction) rate in the three-way catalyst in the case where the air fuel ratio of the incoming exhaust gas has shifted to the lean side with respect to the stoichiometric air fuel ratio. Accordingly, in the present disclosure, in the course of the execution of the air fuel ratio dither control, the suppression of the shift of the average sensor detection value to the rich side with respect to the actual average exhaust gas air fuel ratio of the incoming exhaust gas is given priority over the suppression of the shift thereof to the lean side.

In the present disclosure, the controller may carry out the air fuel ratio dither control, by setting, as the one or more lean cylinders, at least a cylinder with the highest gas impingement intensity in a cylinder group, and by setting, as the one or more rich cylinders, at least a cylinder with the lowest gas impingement intensity in the cylinder group. With this, in the course of the execution of the air fuel ratio dither control, the average sensor detection value becomes more difficult to shift to the rich side with respect to the actual average exhaust gas air fuel ratio of the incoming exhaust gas. For that reason, when the air fuel ratio of the mixture in each of the one or more lean cylinders and the one or more rich cylinders is subjected to feedback control based on the average sensor detection value, the actual average exhaust gas air fuel ratio of the incoming exhaust gas becomes more difficult to shift to the lean side with respect to the target exhaust gas air fuel ratio.

In addition, the air fuel ratio dither control may be carried out by setting, as the one or more lean cylinders, two or more of the plurality of cylinders in a cylinder group. In the present disclosure, in such a case, the controller may carry out the air fuel ratio dither control, by setting, as the one or more lean cylinders, cylinders in the cylinder group in the order of decreasing gas impingement intensity from the highest.

Moreover, the air fuel ratio dither control may be carried out by setting, as the one or more lean cylinders, two cylinders of which the order of combustion is continuous among the plurality of cylinders in a cylinder group. In the present disclosure, in such a case, the controller may carry out the air fuel ratio dither control, by setting, as the one or more lean cylinders, a cylinder with the highest gas impingement intensity in the cylinder group and another cylinder of which the combustion order is adjacent to (immediately before or after) the cylinder with the highest gas impingement intensity and which has a higher gas impingement intensity than that of a cylinder of which the combustion order is adjacent to (immediately after or before) the cylinder with the highest gas impingement intensity.

According to these, when the air fuel ratio dither control is carried out by setting a plurality of cylinders as the one or more lean cylinders, the average sensor detection value becomes much more difficult to shift to a rich side with respect to the actual average exhaust gas air fuel ratio of the incoming exhaust gas, in the course of the execution of the air fuel ratio dither control. For that reason, when the air fuel ratio of the mixture in each of the one or more lean cylinders and the one or more rich cylinders is subjected to feedback control based on the average sensor detection value, the actual average exhaust gas air fuel ratio of the incoming exhaust gas becomes much more difficult to shift to the lean side with respect to the target exhaust gas air fuel ratio.

In the present disclosure, it is possible to suppress a decrease in the NOx removal or reduction rate in a three-way catalyst in the course of the execution of air fuel ratio dither control.

BRIEF DESCRIPTION OF DRAWINGS

FIG. 1 is a diagram showing the general configuration of an internal combustion engine and its intake and exhaust systems according to an embodiment of the present disclosure.

FIG. 2 is a first view showing an arrangement in the vicinity of a connection portion between a merge portion of individual exhaust branch pipes of an exhaust manifold and an exhaust passage in the internal combustion engine illustrated in FIG. 1.

FIG. 3 is a second view showing an arrangement in the vicinity of the connection portion between the merge portion of the individual exhaust branch pipes of the exhaust manifold and the exhaust passage in the internal combustion engine illustrated in FIG. 1.

FIG. 4 is a view showing a cross section of the merge portion of the individual exhaust branch pipes of the exhaust manifold in the internal combustion engine illustrated in FIG. 1.

FIG. 5 is a time chart showing the behavior of the air fuel ratio of incoming exhaust gas when air fuel ratio dither control is carried out in the internal combustion engine.

FIG. 6 is a flow chart showing a flow of the air fuel ratio dither control according to the embodiment of the present disclosure.

FIG. 7 is a first time chart showing the behaviors of the air fuel ratio of the incoming exhaust gas and a detected value of an air fuel ratio sensor when the air fuel ratio dither control is carried out by setting a cylinder with a relatively high gas impingement intensity as the rich cylinder, and by setting a cylinder with a relatively low gas impingement intensity as the lean cylinder.

FIG. 8 is a second time chart showing the behaviors of the air fuel ratio of the incoming exhaust gas and the detected value of the air fuel ratio sensor when the air fuel ratio dither control is carried out by setting a cylinder with a relatively high gas impingement intensity as the rich cylinder, and by setting a cylinder with a relatively low gas impingement intensity as the lean cylinder.

FIG. 9 is a diagram showing the relation between NOx, HC and CO purification rates in a three-way catalyst and the air fuel ratio of exhaust gas.

FIG. 10 is a diagram which shows, in the internal combustion engine shown in FIG. 1, differences in sensor detection values at the time of a rich air fuel ratio for each cylinder in the case of increasing an amount of fuel injection in each of first through fourth cylinders by the same amount from a reference injection amount, from one cylinder to another.

FIG. 11 is a diagram showing an average value ADaf of an amount of shift or deviation of the sensor detection value at the time of the rich air fuel ratio for each cylinder with respect to an average value of the sensor detection value at the time of the rich air fuel ratio, when an amount of intake air in the internal combustion engine in FIG. 10 is in a range from A1 to A6.

FIG. 12 is a diagram showing the relative relation among gas impingement intensities of exhaust gases in the first through fourth cylinders of the internal combustion engine shown in FIG. 1, according to a first embodiment of the present disclosure.

FIG. 13 is a diagram showing a first specific example of the assignment of the lean cylinder and the rich cylinder at the time of carrying out the air fuel ratio dither control in the first embodiment of the present disclosure.

FIG. 14 is a diagram showing a second specific example of the assignment of the lean cylinder and the rich cylinder at the time of carrying out the air fuel ratio dither control in the first embodiment of the present disclosure.

FIG. 15 is a diagram showing a third specific example of the assignment of the lean cylinder and the rich cylinder at the time of carrying out the air fuel ratio dither control in the first embodiment of the present disclosure.

FIG. 16 is a diagram showing a fourth specific example of the assignment of the lean cylinder and the rich cylinder at the time of carrying out the air fuel ratio dither control in the first embodiment of the present disclosure.

FIG. 17 is a diagram which shows, in the internal combustion engine shown in FIG. 1, differences in sensor detection values at the time of a rich air fuel ratio for each cylinder in the case of increasing an amount of fuel injection in each of first through fourth cylinders by the same amount from a reference injection amount, from one cylinder to another, according to a second embodiment of the present disclosure.

FIG. 18 is a diagram showing the relative relation among gas impingement intensities of exhaust gases in the first through fourth cylinders of the internal combustion engine shown in FIG. 1, according to the second embodiment of the present disclosure.

FIG. 19 is a diagram showing a specific example of the assignment of the lean cylinder and the rich cylinder at the time of carrying out the air fuel ratio dither control in the second embodiment of the present disclosure.

FIG. 20 is a diagram showing the relative relation among gas impingement intensities of exhaust gases in the first through fourth cylinders of the internal combustion engine shown in FIG. 1, according to a third embodiment of the present disclosure.

FIG. 21 is a diagram showing the general configuration of an internal combustion engine and its intake and exhaust systems according to a modification of the embodiment of the present disclosure.

DESCRIPTION OF EMBODIMENTS

Hereinafter, specific embodiments of the present disclosure will be described based on the attached drawings. However, the dimensions, materials, shapes, relative arrangements and so on of component parts described in the embodiments are not intended to limit the technical scope of the present disclosure to these alone in particular as long as there are no specific statements.

First Embodiment (General Configuration)

FIG. 1 is a diagram showing the general configuration of an internal combustion engine and its intake and exhaust systems according to an embodiment of the present disclosure. The internal combustion engine denoted by 1 is a gasoline engine for driving a vehicle. The internal combustion engine 1 is an in-line four-cylinder engine comprising four cylinders 2. That is, the internal combustion engine 1 has a single or one cylinder group including four cylinders 2. However, in the internal combustion engine according to the present disclosure, the number of cylinders included in one cylinder group is not limited to four. For example, the number of cylinders included in one cylinder group may also be three or six.

Each of the cylinders 2 of the internal combustion engine 1 is provided with a spark plug 3. An intake manifold 4 and an exhaust manifold 5 are connected to the internal combustion engine 1. The intake manifold 4 has intake branch pipes 4a connected to the individual cylinders 2, respectively. The intake branch pipes 4a are each provided with a fuel injection valve 8 for injecting fuel or gasoline therein. Gasoline is supplied to the individual fuel injection valves 8 from a delivery pipe 9. In addition, a merge portion of the intake branch pipes 4a is connected to an intake passage 6.

In addition, the exhaust manifold 5 has exhaust branch pipes 5a connected to the individual cylinders 2, respectively. Then, a merge portion of the exhaust branch pipes 5a is connected to an exhaust passage 7. An air fuel ratio sensor 11 is arranged on the exhaust passage 7 at its connection portion to the merge portion of the exhaust branch pipes 5a. Moreover, a three-way catalyst 10 is arranged on the exhaust passage 7 at the immediately downstream side of the air fuel ratio sensor 11. That is, the air fuel ratio of the exhaust gas flowing into the three-way catalyst 10 is detected by the air fuel ratio sensor 11. Here, note that the details of the arrangement position of the air fuel ratio sensor 11 in the exhaust passage 7 will be described later.

An electronic control unit (ECU) 20 is provided in combination with the internal combustion engine 1. This ECU 20 is a unit that controls an operating state, etc., of the internal combustion engine 1. The air fuel ratio sensor 11 is electrically connected to the ECU 20. Moreover, a crank angle sensor 21 and an accelerator opening sensor 22 are electrically connected to the ECU 20. The crank angle sensor 21 detects the crank angle of the internal combustion engine 1. The accelerator opening sensor 22 detects the degree of opening of an accelerator of a vehicle carrying thereon the internal combustion engine 1. Then, output signals of these individual sensors are inputted to the ECU 20. The ECU 20 derives the engine speed of the internal combustion engine 1 based on the output signal of the crank angle sensor 21. The ECU 20 derives the engine load of the internal combustion engine 1 based on the output signal of the accelerator opening sensor 22. In addition, the individual spark plugs 3 and the individual fuel injection valves 8 are electrically connected to the ECU 20. Thus, these parts are controlled by the ECU 20. Here, note that the internal combustion engine 1 is constructed such that an amount of fuel injection from each fuel injection valve 8 is able to be changed for each cylinder 2.

(Arrangement Position of the Air Fuel Ratio Sensor)

Next, the details of the arrangement position of the air fuel ratio sensor 11 in the exhaust passage 7 will be described later based on FIGS. 2 through 4. FIGS. 2 and 3 are views which show arrangements in the vicinity of the connection portion between the merge portion of the individual exhaust branch pipes 5a of the exhaust manifold 5 and the exhaust passage 7. FIG. 2 shows a state in the case of seeing from a diagonal right side facing the internal combustion engine 1, and FIG. 3 shows a state in the case of seeing from a diagonal left side facing the internal combustion engine 1. In addition, FIG. 4 shows a cross section of the merge portion of the individual exhaust branch pipes 5a of the exhaust manifold 5. Here, note that in FIGS. 2 through 4, numerals #1 through #4 attached to the individual exhaust branch pipes 5a indicate which cylinders in the internal combustion engine 1 the individual exhaust branch pipes 5a are connected to (e.g., an exhaust branch pipe 5a denoted by #1 is connected to a first cylinder in the internal combustion engine 1). In this embodiment, as shown in FIGS. 2 through 4, the air fuel ratio sensor 11 is arranged in the exhaust passage 7 at a location between an opening portion, to the merge portion, of an exhaust branch pipe connected to a second cylinder and an opening portion, to the merge portion, of an exhaust branch pipe connected to a fourth cylinder.

(Air Fuel Ratio Dither Control)

In this embodiment, when a predetermined temperature rise condition for raising the temperature of the three-way catalyst 10 is satisfied, the ECU 20 carries out air fuel ratio dither control by adjusting an amount of fuel injection (i.e., an amount of injection from each of the fuel injection valves 8) in each of the cylinders 2. In the air fuel ratio dither control according to this embodiment, by adjusting the amount of fuel injection in each of the cylinders 2, the air fuel ratio of a mixture in a part of cylinders 2 among the four cylinders 2 is controlled to a lean air fuel ratio which is leaner than a stoichiometric air fuel ratio, and the air fuel ratio of a mixture in a part of the remaining cylinders 2 among the four cylinders 2 is controlled to a rich air fuel ratio which is richer than the stoichiometric air fuel ratio. Here, that cylinder in which the air fuel ratio of a mixture is controlled to a lean air fuel ratio is referred to as "lean cylinder", and that cylinder in which the air fuel ratio of a mixture is controlled to a rich air fuel ratio is referred to as "rich cylinder". Moreover, in the air fuel ratio dither control, the air fuel ratio of a mixture in each of the lean cylinder and the rich cylinder is controlled in a feedback manner based on an average value of a detected value of the air fuel ratio sensor 11 (an average sensor detection value), so that an average value of the air fuel ratio (i.e., an average exhaust gas air fuel ratio) of an exhaust gas flowing into the three-way catalyst 10 (an incoming exhaust gas) becomes a predetermined target exhaust gas air fuel ratio which is set to a value in the vicinity of the stoichiometric air fuel ratio. Specifically, the amount of fuel injection from each of the fuel injection valves 8 in each of the lean cylinder and the rich cylinder is adjusted based on the average sensor detection value. In addition, in the air fuel ratio dither control according to this embodiment, the target exhaust gas air fuel ratio is set to an air fuel ratio in the vicinity of the stoichiometric air fuel ratio. However, the target exhaust gas air fuel ratio in the air fuel ratio dither control according to the present disclosure is not limited to an air fuel ratio in the vicinity of the stoichiometric air fuel ratio. For example, the air fuel ratio dither control may be carried out, while switching the target exhaust gas air fuel ratio between a predetermined lean air fuel ratio and a predetermined rich air fuel ratio in an alternate manner. Here, note that in such a case, the average value of the air fuel ratio of the incoming exhaust gas in the course of the execution of the air fuel ratio dither control becomes in the vicinity of the stoichiometric air fuel ratio, whereby the HC and CO oxidation function and the NOx reduction function in the three-way catalyst are exhibited, in the course of the execution of the air fuel ratio dither control, too.

FIG. 5 is a time chart which shows the behavior of the air fuel ratio of the incoming exhaust gas when the air fuel ratio dither control in which combustion in the lean cylinder and combustion in the rich cylinder are repeated in an alternate manner for each cylinder is carried out in the internal combustion engine. As shown in FIG. 5, when the air fuel ratio dither control is carried out, an exhaust gas of a lean air fuel ratio and an exhaust gas of a rich air fuel ratio will be supplied to the three-way catalyst in an alternate manner. Then, an average value of the air fuel ratios of the exhaust gas of a lean air fuel ratio and the exhaust gas of a rich air fuel ratio will be controlled to the target exhaust gas air fuel ratio. Here, note that in the air fuel ratio dither control, combustion in the lean cylinder and combustion in the rich cylinder need not necessarily be repeated in an alternate manner for each cylinder. In other words, a part of the cylinders in the cylinder group need only become the lean cylinder, and a part of the other cylinders need only become the rich cylinder.

In this embodiment, it has been decided in advance that when the air fuel ratio dither control is carried out, which cylinder in the first cylinder through the fourth cylinder in the internal combustion engine 1 becomes the lean cylinder, and which cylinder becomes the rich cylinder. Then, a flow shown in FIG. 6 is carried out by the ECU 20 in a repeated manner during the execution of the air fuel ratio dither control according to this embodiment. FIG. 6 is a flow chart showing the flow of the air fuel ratio dither control according to this embodiment. Here, note that in this embodiment, a controller according to the present disclosure is achieved by the ECU 20 carrying out this flow.

In this flow, in step S101, an average sensor detection value is calculated which is an average value of the detected value of the air fuel ratio sensor 11 in a predetermined period of time (e.g., a period of time corresponding to one combustion cycle of the internal combustion engine 1) during the execution of the air fuel ratio dither control. Subsequently, in step S102, the air fuel ratio of a mixture in each of the lean cylinder and the rich cylinder is controlled in a feedback manner, based on the average sensor detection value calculated in step S101. Specifically, when the average sensor detection value calculated in step S101 is higher than the target exhaust gas air fuel ratio, the amount of fuel injection in each cylinder is increased so that the air fuel ratio of the mixture in each of the lean cylinder and the rich cylinder goes down. On the other hand, when the average sensor detection value calculated in step S101 is lower than the target exhaust gas air fuel ratio, the amount of fuel injection in each cylinder is decreased so that the air fuel ratio of the mixture in each of the lean cylinder and the rich cylinder goes up. Thus, the air fuel ratio of the mixture in each of the lean cylinder and the rich cylinder is controlled in this manner, whereby the average exhaust gas air fuel ratio of the incoming exhaust gas will be controlled to the target exhaust gas air fuel ratio.

However, when the air fuel ratio dither control as mentioned above is carried out in the internal combustion engine, there may occur a phenomenon in which the actual average exhaust gas air fuel ratio shifts to the lean side with respect to the target exhaust gas air fuel ratio (i.e., this phenomenon may be hereinafter referred to as a "lean shift of the air fuel ratio of exhaust gas"). Hereinafter, there will be explained a factor in which the lean shift of the air fuel ratio of exhaust gas occurs when the air fuel ratio dither control is carried out.

The exhaust gas discharged from each of the cylinders of the cylinder group of the internal combustion engine flows into the common exhaust passage, while passing through an exhaust branch pipe connected to each cylinder. At that time, the distribution of the exhaust gas discharged from each cylinder does not become uniform, but has a certain amount of deviation or shift for each cylinder, on a cross section of the exhaust passage. Then, when the air fuel ratio sensor is arranged on a path in which the exhaust gas discharged from a cylinder mainly flows, the gas impingement intensity of the exhaust gas discharged from the cylinder becomes high. On the other hand, when the air fuel ratio sensor is arranged at a location out of the path in which the exhaust gas discharged from the cylinder mainly flows, the gas impingement intensity of the exhaust gas discharged from the cylinder becomes low. For that reason, there may occur cylinders in which the gas impingement intensity is relatively high, and cylinders in which the gas impingement intensity is relatively low, resulting from the relation between the path in which the exhaust gas discharged from each cylinder mainly flows, and the location of arrangement of the air fuel ratio sensor in the exhaust passage.

Then, when there exist a cylinder with a relatively high gas impingement intensity and a cylinder with a relatively low gas impingement intensity in the internal combustion engine, when the air fuel ratio dither control is carried out by setting the cylinder with a relatively high gas impingement intensity as the rich cylinder, the average sensor detection value may become lower than the actual average exhaust gas air fuel ratio of the incoming exhaust gas, as shown in FIGS. 7 and 8. FIGS. 7 and 8 are time charts showing the behaviors of the air fuel ratio of the incoming exhaust gas and the detected value of the air fuel ratio sensor when air fuel ratio dither control, in which combustion in the lean cylinder and combustion in the rich cylinder are repeated in an alternate manner for each cylinder, is carried out by setting a cylinder with a relatively high gas impingement intensity as the rich cylinder, and by setting a cylinder with a relatively low gas impingement intensity as the lean cylinder. In FIGS. 7 and 8, solid lines each indicate the behavior of the actual air fuel ratio of the incoming exhaust gas, similar to FIG. 5. In addition, in FIGS. 7 and 8, broken lines each indicate the behavior of the detected value of the air fuel ratio sensor 11.

The detection sensitivity of the air fuel ratio sensor for the air fuel ratio tends to become higher in the case of the exhaust gas discharged from the cylinder with a relatively high gas impingement intensity, in comparison with the exhaust gas discharged from the cylinder with a relatively low gas impingement intensity. In such a case, when the air fuel ratio dither control is carried out by setting a cylinder with a relatively high gas impingement intensity as the rich cylinder, and by setting a cylinder with a relatively low gas impingement intensity as the lean cylinder, the detected value of the air fuel ratio sensor becomes, on the whole, richer than the actual air fuel ratio of the incoming exhaust gas, as shown in FIG. 7. In that case, even when the actual average air fuel ratio of the incoming exhaust gas becomes the target exhaust gas air fuel ratio, the average sensor detection value becomes a value lower than the target exhaust gas air fuel ratio.

In addition, a larger amount of $H_2$ is contained in the exhaust gas of the rich air fuel ratio, in comparison with that in the exhaust gas of the lean air fuel ratio. For that reason, when the cylinder with a relatively high gas impingement intensity is set as the rich cylinder, an amount of $H_2$ in the exhaust gas detected by the air fuel ratio sensor (i.e., an amount of $H_2$ in contact with a sensor element of the air fuel ratio sensor) may increase. In this case, when the air fuel ratio sensor detects the air fuel ratio of the exhaust gas discharged from the cylinder with a relatively high gas impingement intensity, the detected value of the air fuel ratio sensor becomes a value richer than the actual air fuel ratio of the incoming exhaust gas, as shown in FIG. 8. In that case, even when the actual average air fuel ratio of the incoming exhaust gas becomes the target exhaust gas air fuel ratio, the average sensor detection value becomes a value lower than the target exhaust gas air fuel ratio, as in the case shown in FIG. 7.

For the reason as mentioned above, when the average sensor detection value is shifted to a rich side with respect to the actual average exhaust gas air fuel ratio of the incoming exhaust gas in the course of the execution of the air fuel ratio dither control, a lean shift of the air fuel ratio of exhaust gas will occur, due to the air fuel ratio of the mixture in each of the lean cylinder and the rich cylinder being subjected to feedback control based on the average sensor detection value.

Here, the relation between the NOx, HC and CO purification rates in the three-way catalyst and the exhaust gas air fuel ratio will be explained based on FIG. 9. In FIG. 9, the axis of abscissa represents the exhaust gas air fuel ratio, and the axis of ordinate represents the NOx, HC and CO purification rates in the three-way catalyst. Then, a predetermined region of the exhaust gas air fuel ratio shown by a diagonally shaded area in FIG. 9 indicates a purification window in which both of the NOx reduction ratio and the HC and CO purification rates in the three-way catalyst become suitable values. As shown in FIG. 9, the predetermined region containing the stoichiometric air fuel ratio (A/F=14.6) therein becomes the purification window of the three-way catalyst. For that reason, when a lean shift of the air fuel ratio of exhaust gas occurs during the execution of the air fuel ratio dither control, and when the degree of leanness of the actual average exhaust gas air fuel ratio of the incoming exhaust gas becomes larger, the NOx reduction ratio in the three-way catalyst will drop.

Accordingly, in this embodiment, when the air fuel ratio dither control is carried out in the internal combustion engine 1, the ECU 20 carries out the air fuel ratio dither control so as to suppress the lean shift of the air fuel ratio of exhaust gas, by setting, as the lean cylinder, a cylinder with the highest gas impingement intensity among the first cylinder through the fourth cylinder. According to this, the average sensor detection value becomes difficult to shift to a rich side with respect to the actual average exhaust gas air fuel ratio of the incoming exhaust gas, in comparison with the case where the air fuel ratio dither control is carried out by setting a cylinder with the highest gas impingement intensity as the rich cylinder. In other words, in the course of the execution of the air fuel ratio dither control, the average sensor detection value is suppressed from becoming a value lower than the target exhaust gas air fuel ratio, in spite of the fact that the actual average air fuel ratio of the incoming exhaust gas is the target exhaust gas air fuel ratio. For that reason, when the air fuel ratio of the mixture in each of the lean cylinder and the rich cylinder is subjected to feedback control based on the average sensor detection value, the actual average exhaust gas air fuel ratio of the incoming exhaust gas becomes difficult to shift to a lean side with respect to the target exhaust gas air fuel ratio. Accordingly, it is possible to suppress a decrease in the NOx removal or reduction rate in the three-way catalyst 10 in the course of the execution of the air fuel ratio dither control.

Here, note that when the air fuel ratio dither control is carried out in the internal combustion engine 1, if the air fuel ratio dither control is carried out by setting, as the lean cylinder, a cylinder with the highest gas impingement intensity among the first cylinder through the fourth cylinder, the average sensor detection value may become easy to shift to a lean side with respect to the actual average exhaust gas air fuel ratio of the incoming exhaust gas, contrary to the case where the air fuel ratio dither control is carried out by setting a cylinder with the highest gas impingement intensity as the rich cylinder. In this case, when the air fuel ratio of the mixture in each of the lean cylinder and the rich cylinder is subjected to feedback control based on the average sensor detection value, the actual average exhaust gas air fuel ratio of the incoming exhaust gas becomes easy to shift to a rich side with respect to the target exhaust gas air fuel ratio. However, as shown in FIG. 9, the degree of decrease in each of the HC and CO purification (removal or oxidation) rates in the three-way catalyst in the case where the air fuel ratio of the incoming exhaust gas has shifted to the rich side with respect to the stoichiometric air fuel ratio and has become out of the purification window is smaller than the degree of decrease in the NOx purification (removal or reduction) rate in the three-way catalyst in the case where the air fuel ratio of the incoming exhaust gas has shifted to the lean side with respect to the stoichiometric air fuel ratio and has become out of the purification window. Accordingly, in this embodiment, even if the actual average exhaust gas air fuel ratio of the incoming exhaust gas has shifted to the rich side with respect to the target exhaust gas air fuel ratio in the course of the execution of the air fuel ratio dither control, an overall influence with respect to the exhaust gas purification in the three-way catalyst 10 is smaller in the case where the actual average air fuel ratio of the incoming exhaust gas has shifted to the lean side with respect to the target exhaust gas air fuel ratio. Thus, in this embodiment, the shift of the actual average exhaust gas air fuel ratio of the incoming exhaust gas to the lean side with respect to the target exhaust gas air fuel ratio is preferentially suppressed rather than the shift thereof to the rich side, in the course of the execution of the air fuel ratio dither control. In other words, the suppression of the shift of the average sensor detection value to the rich side with respect to the actual average exhaust gas air fuel ratio of the incoming exhaust gas is given priority over the suppression of the shift thereof to the lean side, in the course of the execution of the air fuel ratio dither control.

(Gas Impingement Intensities)

In this embodiment, the relative relation among the gas impingement intensities of exhaust gases discharged from the individual cylinders of the internal combustion engine 1 has been obtained in advance by experiments. Then, it has been decided in advance based on the relative relation among the gas impingement intensities obtained by the experiments that at the time of carrying out the air fuel ratio dither control, which cylinder in the first cylinder through the fourth cylinder in the internal combustion engine 1 becomes the lean cylinder, and which cylinder becomes the rich cylinder. Here, the specific relative relation among the gas impingement intensities of exhaust gases discharged from the individual cylinders of the internal combustion engine 1 will be explained based on FIGS. 10 and 11.

FIGS. 10 and 11 are diagrams showing the result of the experiments which have been performed in order to obtain the relative relation among the gas impingement intensities of exhaust gases discharged from the individual cylinders 2 of the internal combustion engine 1. In the experiments, an amount of fuel injection in each of the first through fourth cylinders of the internal combustion engine 1 was increased by the same amount (e.g., 10%) from a reference injection amount (i.e., an amount of fuel injection in which the air fuel ratio of a mixture becomes the stoichiometric air fuel ratio) from one cylinder to another, and the air fuel ratio of exhaust gas discharged from each cylinder at that time was detected by the air fuel ratio sensor 11. Hereinafter, the average sensor detection value when such experiments were performed is referred to as a "sensor detection value at the time of a rich air fuel ratio (or a rich time sensor detection value)".

Then, FIG. 10 shows differences in the sensor detection values at the time of a rich air fuel ratio for the individual cylinders when the experiments as mentioned above were performed. In FIG. 10, the axis of abscissa represents an amount of intake air Aair in the internal combustion engine 1. Here, note that a range of A1 to A6 in the axis of abscissa corresponds to a range of the amount of intake air in the operating region of the internal combustion engine 1 in which the air fuel ratio dither control is carried out. In addition, in FIG. 10, the axis of ordinate represents amounts of deviation or shift Daf of the sensor detection value for each cylinder at the time of the rich air fuel ratio (hereinafter, this may also be simply referred to as an "amount of shift of the rich time sensor detection value".) when based on an average value of the sensor detection values for the four cylinders at the time of the rich air fuel ratio in each of the amounts of intake air (hereinafter, this may also be referred to as an "average value of the rich time sensor detection value"). Specifically, in FIG. 10, round marks indicate the amounts of shift of the rich time sensor detection value in the case of increasing the amount of fuel to be injected into the first cylinder. In addition, square marks indicate the amounts of shift of the rich time sensor detection value in the case of increasing the amount of fuel to be injected into the second cylinder. Moreover, triangle marks indicate the amounts of shift of the rich time sensor detection value in the case of increasing the amount of fuel to be injected into the third cylinder. Further, x marks indicate the amounts of shift of the rich time sensor detection value in the case of increasing the amount of fuel to be injected into the fourth cylinder. Then, in FIG. 10, when an amount of shift Daf of the rich time sensor detection value is a plus value, it is indicated that the value is larger than the average value of the rich time sensor detection value (i.e., the degree of richness of the detected value of the air fuel ratio sensor 11 is relatively small). On the contrary, when this amount of shift Daf of the rich time sensor detection value is a minus value, it is indicated that the value is smaller than the average value of the rich time sensor detection value (i.e., the degree of richness of the detected value of the air fuel ratio sensor 11 is relatively large).

Moreover, FIG. 11 shows an average value ADaf of the amount of shift Daf of the rich time sensor detection value for each cylinder, when the amount of intake air in the internal combustion engine 1 is in a range from A1 to A6 in FIG. 10 (hereinafter, this may simply be referred to as an average value ADaf of the amount of shift of the rich time sensor detection value). In FIG. 11, when the average value ADaf of the amount of shift of the rich time sensor detection value is a plus value, it is indicated that the value is larger than the average value of the rich time sensor detection value. On the contrary, when the average value ADaf of the amount of shift of the rich time sensor detection value is a minus value, it is indicated that the value is smaller than the average value of the rich time sensor detection value.

In the above-mentioned experiments, the amounts of fuel to be injected into the individual cylinders are respectively increased from the reference injection amount by the same amount for each cylinder. For that reason, the actual air fuel ratio of the exhaust gas discharged from each of the cylinders in which the amount of fuel injection was increased becomes the same. Accordingly, even when the amount of fuel to be injected into any cylinder is increased, the average value of the actual air fuel ratio of the exhaust gas discharged from each of the cylinders becomes the same. However, in the rich time sensor detection values, there occur differences for the individual cylinders, as shown in FIG. 10. The differences in the rich time sensor detection values occur resulting from the gas impingement intensities of exhaust gases discharged from the individual cylinders 2. In other words, the higher the gas impingement intensity of a cylinder in which the amount of fuel injection is increased more than the reference injection amount, the easier the detected value of the air fuel ratio sensor 11 becomes to be affected by the influence of the air fuel ratio of the exhaust gas discharged from that cylinder, and hence, the richer the rich time sensor detection value becomes. For that reason, even if the average value of the actual air fuel ratio of the exhaust gas discharged from each of the cylinders is the same, the rich time sensor detection value in the case of increasing the amount of fuel to be injected into the cylinder with a relatively high gas impingement intensity more than the reference injection amount becomes smaller than the rich time sensor detection value in the case of increasing the amount of fuel to be injected into the cylinder with a relatively low gas impingement intensity more than the reference injection amount.

Then, as shown in FIG. 10, in the case of this embodiment, in spite of the amount of intake air in the internal combustion engine 1, the amount of shift Daf of the rich time sensor detection value in the case of increasing the amount of fuel to be injected into the second cylinder or the fourth cylinder more than the reference injection amount is a minus value, whereas the amount of shift Daf of the rich time sensor detection value in the case of increasing the amount of fuel to be injected into the first cylinder or the third cylinder more than the reference injection amount is a plus value. For that reason, as shown in FIG. 11, the average value ADaf of the amount of shift of the rich time sensor detection value in the case of increasing the amount of fuel to be injected into the second cylinder or the fourth cylinder more than the reference injection amount becomes a minus value, whereas the average value ADaf of the amount of shift of the rich time sensor detection value in the case of increasing the amount of fuel to be injected into the first cylinder or the third cylinder more than the reference injection amount becomes a plus value. Accordingly, in the internal combustion engine 1 according to this embodiment, it can be judged that the gas impingement intensity of the exhaust gas discharged from each of the second cylinder and the fourth cylinder is higher than the gas impingement intensity of the exhaust gas discharged from each of the first cylinder and the third cylinder.

It is considered that differences in the gas impingement intensities for the individual cylinders in the internal combustion engine 1 as mentioned above occur resulting from the arrangement position of the air fuel ratio sensor 11 in the exhaust passage 7, as shown in FIGS. 2 through 4. In other words, as mentioned above, in this embodiment, the air fuel ratio sensor 11 is arranged in the exhaust passage 7 at a location between an opening portion, to the merge portion, of the exhaust branch pipe connected to the second cylinder and the opening portion, to the merge portion, of the exhaust branch pipe connected to the fourth cylinder. For that reason, the air fuel ratio sensor 11 will be positioned in the exhaust passage 7 on a path in which the exhaust gas discharged from each of the second cylinder and the fourth cylinder mainly flows. On the other hand, the air fuel ratio sensor 11 will be positioned in the exhaust passage 7 at a location out of a path in which the exhaust gas discharged from each of the first cylinder and the third cylinder mainly flows. As a result, it is considered that in the internal combustion engine 1, the gas impingement intensity of the exhaust gas discharged from each of the second cylinder and the fourth cylinder is higher than the gas impingement intensity of the exhaust gas discharged from each of the first cylinder and the third cylinder.

In this embodiment, the relative relation of the gas impingement intensities of the exhaust gases in the first cylinder through the fourth cylinder of the internal combustion engine 1 is further defined based on the average value ADaf of the amount of shift of the rich time sensor detection value for each of the cylinders, as shown in FIG. 11. As shown in FIG. 11, when a comparison is made between the second cylinder and the fourth cylinder, the average value ADaf of the amount of shift of the rich time sensor detection value is smaller for the second cylinder than for the fourth cylinder. In addition, when a comparison is made between the first cylinder and the third cylinder, the average value ADaf of the amount of shift of the rich time sensor detection value is smaller for the third cylinder than for the first cylinder. For that reason, the relative relation of the gas impingement intensities of the exhaust gases in the first cylinder through the fourth cylinder of the internal combustion engine 1 is defined, as shown in FIG. 12. In other words, in this embodiment, it is defined that the gas impingement intensity of the exhaust gas becomes lower (decreases) in order of the second cylinder, the fourth cylinder, the third cylinder, and the first cylinder.

Then, as mentioned above, in this embodiment, when air fuel ratio dither control is carried out in the internal combustion engine 1, it is carried out by setting, as the lean cylinder, a cylinder with the highest gas impingement intensity among the first cylinder through the fourth cylinder. In other words, in the internal combustion engine 1, the air fuel ratio dither control is carried out by setting the second cylinder as the rich cylinder. Moreover, in this embodiment, whether a cylinder other than the second cylinder is set as the lean cylinder or the rich cylinder at the time of carrying out the air fuel ratio dither control is decided by taking account of the combustion order (firing order) of the individual cylinders, the number of cylinders to be set as the lean cylinder, and the number of cylinders to be set as the rich cylinder, in addition to the relative relation of the gas impingement intensities. Hereinafter, specific examples of assignment of the lean cylinder and the rich cylinder at the time of carrying out the air fuel ratio dither control in the internal combustion engine 1 will be explained based on FIGS. 13 through 16. Here, note that in this embodiment, the assignment of the lean cylinder and the rich cylinder as shown in FIGS. 13 through 16 has been stored in the ECU 20 in advance. Then, based on the assignment thus stored, the ECU 20 carries out the air fuel ratio dither control by setting a part of the cylinders as the lean cylinder, and a part of the other cylinders as the rich cylinder.

Specific Example 1

FIG. 13 is a diagram showing the assignment of the lean cylinder and the rich cylinder in the air fuel ratio dither control in the internal combustion engine 1 in the case of repeating combustion in the lean cylinder, and combustion in the rich cylinder in an alternate manner cylinder by cylinder. In this case, the second cylinder, which is a cylinder with the highest gas impingement intensity, is assigned to the lean cylinder, so that whether the other cylinders are to be assigned to the lean cylinder or the rich cylinder will be necessarily decided according to the combustion order in the internal combustion engine 1. In this embodiment, as shown in FIG. 13, the combustion order in the internal combustion engine 1 is as follows: the first cylinder, the third cylinder, the fourth cylinder, and the second cylinder. Accordingly, the air fuel ratio dither control is carried out by assigning the second cylinder and the third cylinder as the lean cylinders, and by assigning the first cylinder and the fourth cylinder as the rich cylinders.

Specific Example 2

FIG. 14 is a diagram showing the assignment of the lean cylinder and the rich cylinder in the case of carrying out the air fuel ratio dither control by assigning only one cylinder as the lean cylinder, and the other three cylinders as the rich cylinders, in the internal combustion engine 1. In this case, the second cylinder, which is a cylinder with the highest gas impingement intensity, is assigned to the lean cylinder, so that the other cylinders will be necessarily assigned to the rich cylinders. That is, as shown in FIG. 14, the air fuel ratio dither control is carried out by assigning the second cylinder as the lean cylinder, and by assigning the other cylinders as the rich cylinders.

Specific Example 3

FIG. 15 is a diagram showing the assignment of the lean cylinder and the rich cylinder in the case of carrying out the air fuel ratio dither control by assigning two cylinders having a sequential combustion order as the lean cylinders, and by assigning the other two cylinders having a sequential combustion order as the rich cylinders, in the internal combustion engine 1. In this case, the second cylinder with the highest gas impingement intensity is assigned to the lean cylinder, so that either the fourth cylinder, of which the combustion order is immediately preceding (before) the second cylinder, or the first cylinder, of which the combustion order is immediately succeeding (after) the second cylinder, will be assigned to the lean cylinder. In such a case, the one of the fourth cylinder and the first cylinder, of which the gas impingement intensity is higher than the other, may be assigned to the lean cylinder. In other words, as shown in FIG. 15, the air fuel ratio dither control may be carried out, by assigning as the lean cylinders the second cylinder and the fourth cylinder, of which the gas impingement intensity is higher than that of the first cylinder, and by assigning as the rich cylinders the remaining cylinders, i.e., the first cylinder and the third cylinder.

In addition, when the air fuel ratio dither control is carried out by assigning two cylinders as the lean cylinders, and the other two cylinders as the rich cylinders, irrespective of the combustion order, cylinders may be assigned to the lean cylinders, preferentially in order from high to low gas impingement intensities. In the internal combustion engine 1 according to this embodiment, the gas impingement intensity of the fourth cylinder is the second highest. For that reason, even if two cylinders are assigned to the lean cylinders in order from high to low gas impingement intensities irrespective of the combustion order, the second cylinder and the fourth cylinder are assigned to the lean cylinders, and the first cylinder and the third cylinder are assigned to the rich cylinders, similar to FIG. 15.

Specific Example 4

FIG. 16 is a diagram showing the assignment of the lean cylinder and the rich cylinder in the case of carrying out the air fuel ratio dither control by assigning three cylinders as the lean cylinders, and the remaining one cylinder as the rich cylinder, in the internal combustion engine 1. In this case, too, the three cylinders may be assigned to the lean cylinders in order from high to low gas impingement intensities. That is, as shown in FIG. 16, the air fuel ratio dither control may be carried out by assigning only the first cylinder with the lowest gas impingement intensity as the rich cylinder, and by assigning the other cylinders as the lean cylinders.

As in the case of the above-mentioned specific examples 3 and 4, when the air fuel ratio dither control is carried out by assigning or setting two or more of the four cylinders as the lean cylinders, the cylinders with higher gas impingement intensities are preferentially assigned to the lean cylinder, so that in the course of the execution of the air fuel ratio dither control, the average sensor detection value becomes more difficult to shift to the rich side with respect to the actual average exhaust gas air fuel ratio of the incoming exhaust gas. For that reason, when the air fuel ratio of the mixture in each of the lean cylinder and the rich cylinder is subjected to feedback control based on the average sensor detection value, the actual average exhaust gas air fuel ratio of the incoming exhaust gas becomes more difficult to shift to the lean side with respect to the target exhaust gas air fuel ratio. Accordingly, it is possible to suppress a decrease in the NOx removal or reduction rate in the three-way catalyst 10 in the course of the execution of the air fuel ratio dither control to a further extent.

Moreover, in FIGS. 15 and 16, the second cylinder with the highest gas impingement intensity is assigned to the lean cylinder, and at the same time, the first cylinder with the lowest gas impingement intensity is assigned to the rich cylinder. According to this, in comparison with the case if the first cylinder with the lowest gas impingement intensity is assigned to the lean cylinder, and either one or both of the remaining third and fourth cylinders are assigned to the rich cylinder, the average sensor detection value becomes more difficult to shift to the rich side with respect to the actual average exhaust gas air fuel ratio of the incoming exhaust gas, in the course of the execution of the air fuel ratio dither control. Accordingly, it becomes possible to suppress a decrease in the NOx removal or reduction rate in the three-way catalyst 10 in the course of the execution of the air fuel ratio dither control to a further extent.

Here, note that, as mentioned above, in this embodiment, the average value ADaf of the amount of shift of the rich time sensor detection value is set to an average value of the amount of shift of the rich time sensor detection value for each cylinder, when the amount of intake air in the internal combustion engine 1 is in the range from A1 to A6 in FIG. 10, i.e., in the entire range of the amount of intake air in the operating region of the internal combustion engine 1 in which the air fuel ratio dither control is carried out. Then, the relative relation of the gas impingement intensities of exhaust gases in the first cylinder through the fourth cylinder of the internal combustion engine 1 has been defined, based on this average value ADaf of the amount of shift of the rich time sensor detection value. However, the average value ADaf of the amount of shift of the rich time sensor detection value may be set to an average value of the amount of shift of the rich time sensor detection value for each cylinder, in a part of the entire range of the amount of intake air in the operating region of the internal combustion engine 1 in which the air fuel ratio dither control is carried out. Here, there is a tendency that the difference in the detected value of the air fuel ratio sensor 11 occurring resulting from the fact that the gas impingement intensities of exhaust gases from the cylinders vary from cylinder to by cylinder is easy to become larger, as the amount of intake air in the internal combustion engine 1 increases. For that reason, it is possible to adopt, as the average value ADaf of the amount of shift of the rich time sensor detection value, an average value of the amount of shift of the rich time sensor detection value for each cylinder in a partial range including an upper limit value (i.e., A6 in FIG. 10) in the range of the amount of intake air in the operating region of the internal combustion engine 1 in which the air fuel ratio dither control is carried out.

Second Embodiment

The general configuration of an internal combustion engine and its intake and exhaust systems according to a second embodiment is the same as that in the first embodiment. In this second embodiment, a parameter for defining the relative relation of the gas impingement intensities of the exhaust gases in the first cylinder through the fourth cylinder of the internal combustion engine 1 is different from that in the above-mentioned first embodiment. In the first embodiment, the relative relation of the gas impingement intensities of the exhaust gases in the first cylinder through the fourth cylinder of the internal combustion engine 1 is defined based on the average value ADaf of the amount of shift of the rich time sensor detection value for each of the cylinders, as shown in FIG. 11. In contrast to this, in this second embodiment, the relative relation of the gas impingement intensities of exhaust gases in the first cylinder through the fourth cylinder of the internal combustion engine 1 is defined, based on an amount of shift of the rich time sensor detection value at the time when an absolute value of the amount of shift Daf of the rich time sensor detection value in each cylinder becomes a maximum (hereinafter, this may also be referred to as an "amount of shift of the rich time sensor detection value at the time of the maximum of the absolute value"), in the range of the amount of intake air in the operating region of the internal combustion engine 1 in which the air fuel ratio dither control is carried out. This is because it can also be thought that when the absolute value of the amount of shift Daf of the rich time sensor detection value becomes a maximum in the operating region of the internal combustion engine 1 in which the air fuel ratio dither control is carried out, the detected value of the air fuel ratio sensor 11 is affected by the largest influence of the gas impingement intensities of the exhaust gases which are different from cylinder to cylinder.

FIG. 17 is a diagram similar to FIG. 10. In other words, this figure is a diagram showing the result of an experiment when the experiment was performed in order to obtain the relative relation among the gas impingement intensities of exhaust gases in the first cylinder through the fourth cylinder of the internal combustion engine 1, similar to the first embodiment. As in FIG. 10, a range of A1 to A6 in the axis of abscissa in FIG. 17 corresponds to a range of the amount of intake air in the operating region of the internal combustion engine 1 in which the air fuel ratio dither control is carried out. Also, similar to FIG. 10, the axis of ordinate in FIG. 17 represents an amount of shift Daf of the rich time sensor detection value for each cylinder in individual amounts of intake air. Then, in FIG. 17, a value surrounded by a circle of an alternate long and short dash line indicates an amount of shift of the rich time sensor detection value at the time of the maximum of the absolute value in each cylinder.

Of course, as shown in FIG. 17, the amount of shift of the rich time sensor detection value at the time of the maximum of the absolute value in each of the second cylinder and the fourth cylinder is a minus value, whereas the amount of shift of the rich time sensor detection value at the time of the maximum of the absolute value in each of the first cylinder and the third cylinder is a plus value. Then, as shown in FIG. 17, when a comparison is made between the second cylinder and the fourth cylinder, the value of the amount of shift of the rich time sensor detection value at the time of the maximum of the absolute value is smaller for the second cylinder than for the fourth cylinder. Also, when a comparison is made between the first cylinder and the third cylinder, the value of the amount of shift of the rich time sensor detection value at the time of the maximum of the absolute value is smaller for the first cylinder than for the third cylinder. For that reason, the relative relation of the gas impingement intensities of the exhaust gases in the first cylinder through the fourth cylinder of the internal combustion engine 1 is defined, as shown in FIG. 18. In other words, in this second embodiment, it is defined that the gas impingement intensity of the exhaust gas becomes lower (decreases) in order of the second cylinder, the fourth cylinder, the first cylinder, and the third cylinder.

Then, also in this second embodiment, the relation between the assignment of the lean cylinder and the rich cylinder, and the relative relation of the gas impingement intensities for the individual cylinders, at the time of carrying out the air fuel ratio dither control in the internal combustion engine 1 becomes the same as that in the first embodiment. That is, when the air fuel ratio dither control is carried out in the internal combustion engine 1, it is carried out at least by setting, as the lean cylinder, the second cylinder which is a cylinder with the highest gas impingement intensity. Moreover, whether cylinders other than the second cylinder are each set as the lean cylinder or the rich cylinder at the time of carrying out the air fuel ratio dither control is decided by taking account of the combustion order (firing order) of the individual cylinders, the number of cylinders to be set as the lean cylinder and the number of cylinders to be set as the rich cylinder, in addition to the relative relation of the gas impingement intensities for the individual cylinders, similar to the individual specific examples in the first embodiment.

At this time, when the first through fourth cylinders are each assigned to the lean cylinder or the rich cylinder, as in the specific examples 1 through 3 in the first embodiment, in this second embodiment, too, the assignment of the lean cylinder and the rich cylinder becomes the same as the assignment shown in each of FIGS. 13 through 15. However, as shown in FIG. 18, this second embodiment is different from the first embodiment in the following definition. That is, a cylinder with the third highest gas impingement intensity is the first cylinder, and a cylinder with the lowest gas impingement intensity is the third cylinder (in the first embodiment, as shown in FIG. 12, it is defined that a cylinder with the third highest gas impingement intensity is the third cylinder, and a cylinder with the lowest gas impingement intensity is the first cylinder). For that reason, as in the specific example 4 of the first embodiment, the assignment of the lean cylinder and the rich cylinder in the case of carrying out the air fuel ratio dither control by assigning three cylinders as the lean cylinders and the remaining one cylinder as the rich cylinder in the internal combustion engine 1 becomes as shown in FIG. 19, unlike that shown in FIG. 16. That is, in this case, the air fuel ratio dither control is carried out by assigning only the third cylinder as the rich cylinder, and by assigning the other cylinders as the lean cylinders.

Third Embodiment

The general configuration of an internal combustion engine and its intake and exhaust systems according to a third embodiment is the same as that in the first embodiment. In this third embodiment, a parameter for defining the relative relation of the gas impingement intensities of the exhaust gases in the first cylinder through the fourth cylinder of the internal combustion engine 1 is different from those in the above-mentioned first and second embodiments. In this third embodiment, in the range of the amount of intake air in the operating region of the internal combustion engine 1 in which the air fuel ratio dither control is carried out, the relative relation of the gas impingement intensities of exhaust gases in the first cylinder through the fourth cylinder of the internal combustion engine 1 is defined, based on an amount of shift of the rich time sensor detection value at the time when the amount of intake air is an upper limit value (hereinafter, this may also be referred to as an "amount of shift of the rich time sensor detection value at the upper limit of the amount of intake air"). This is because it can also be thought that when the amount of intake air is an upper limit value in the operating region of the internal combustion engine 1 in which the air fuel ratio dither control is carried out, the detected value of the air fuel ratio sensor 11 is affected by the largest influence of the gas impingement intensities of the exhaust gases which are different from cylinder to cylinder.

FIG. 20 is a diagram similar to FIG. 10. In other words, this figure is a diagram showing the result of an experiment when the experiment was performed in order to obtain the relative relation among the gas impingement intensities of exhaust gases in the first cylinder through the fourth cylinder of the internal combustion engine 1, similar to the first embodiment. As in FIG. 10, a range of A1 to A6 in the axis of abscissa in FIG. 20 corresponds to a range of the amount of intake air in the operating region of the internal combustion engine 1 in which the air fuel ratio dither control is carried out. That is, A6 in FIG. 20 corresponds to the upper limit value of the amount of intake air in the operating region of the internal combustion engine 1 in which the air fuel ratio dither control is carried out. Also, similar to FIG. 10, the axis of ordinate in FIG. 20 represents an amount of shift Daf of the rich time sensor detection value for each cylinder in individual amounts of intake air. Then, in FIG. 20, a value surrounded by a circle of an alternate long and short dash line indicates an amount of shift of the rich time sensor detection value at the upper limit of the amount of intake air in each cylinder.

Of course, as shown in FIG. 20, the amount of shift of the rich time sensor detection value at the upper limit of the amount of intake air in each of the second cylinder and the fourth cylinder is a minus value, whereas the amount of shift of the rich time sensor detection value at the upper limit of the amount of intake air in each of the first cylinder and the third cylinder is a plus value. Then, as shown in FIG. 20, when a comparison is made between the second cylinder and the fourth cylinder, the value of the amount of shift of the rich time sensor detection value at the upper limit of the amount of intake air is smaller for the second cylinder than for the fourth cylinder. Also, when a comparison is made between the first cylinder and the third cylinder, the value of the amount of shift of the rich time sensor detection value at the upper limit of the amount of intake air is smaller for the first cylinder than for the third cylinder. For that reason, the relative relation of the gas impingement intensities of the exhaust gases in the first cylinder through the fourth cylinder of the internal combustion engine 1 is defined similarly to the relative relation in the above-mentioned second embodiment shown in FIG. 18. In other words, in this third embodiment, it is defined that the gas impingement intensity of the exhaust gas becomes lower (decreases) in order of the second cylinder, the fourth cylinder, the first cylinder, and the third cylinder.

Then, also in this third embodiment, the relation between the assignment of the lean cylinder and the rich cylinder, and the relative relation of the gas impingement intensities for the individual cylinders, at the time of carrying out the air fuel ratio dither control in the internal combustion engine 1 becomes the same as that in the first embodiment. That is, in cases where the air fuel ratio dither control is carried out in the internal combustion engine 1, it is carried out at least by setting, as the lean cylinder, the second cylinder which is a cylinder with the highest gas impingement intensity. Moreover, whether cylinders other than the second cylinder are each set as the lean cylinder or the rich cylinder at the time of carrying out the air fuel ratio dither control is decided by taking account of the combustion order (firing order) of the individual cylinders, the number of cylinders to be set as the lean cylinder and the number of cylinders to be set as the rich cylinder, in addition to the relative relation of the gas impingement intensities for the individual cylinders, similar to the individual specific examples in the first embodiment.

At this time, when the first through fourth cylinders are each assigned to the lean cylinder or the rich cylinder, as in the specific examples 1 through 3 in the first embodiment, in this second embodiment, too, the assignment of the lean cylinder and the rich cylinder becomes the same as the assignment shown in each of FIGS. 13 through 15. In addition, in this third embodiment, as in the specific example 4 of the first embodiment, the assignment of the lean cylinder and the rich cylinder in the case of carrying out the air fuel ratio dither control by assigning three cylinders as the lean cylinders and the remaining one cylinder as the rich cylinder in the internal combustion engine 1 becomes as shown in FIG. 19, similar to the case of the second embodiment.

<Modification>

The exhaust gas purification system for an internal combustion engine according to the present disclosure can be applied not only to an engine comprising a single cylinder group including a plurality of cylinders, such as the internal combustion engine 1 shown in FIG. 1, but also to an engine comprising a plurality of cylinder groups. FIG. 21 is a diagram that shows the general configuration of an internal combustion engine and its exhaust system when an exhaust gas purification system for an internal combustion engine according to the present disclosure is applied to a V type 8-cylinder gasoline engine.

An internal combustion engine 300 shown in FIG. 21 has a first cylinder group 310 and a second cylinder group 320. The first cylinder group 310 includes four cylinders (i.e., first through fourth cylinders) 312. The second cylinder group 320 also includes four cylinders (fifth through eighth cylinders) 322. The cylinders 312, 322 of the first and second cylinder groups 310, 320 are each provided with a spark plug 313 or a spark plug 323.

An exhaust manifold 315 is connected to the first cylinder group 310. The exhaust manifold 315 has exhaust branch pipes 315a connected to the individual cylinders 312 of the first cylinder group 310, respectively. Also, an exhaust manifold 325 is connected to the second cylinder group 320. The exhaust manifold 325 has exhaust branch pipes 325a connected to the individual cylinders 322 of the second cylinder group 320, respectively. In addition, an intake manifold is connected to each of the individual cylinder groups 310, 320, and the intake manifold has a plurality of intake branch pipes connected to the individual cylinders of the first and second cylinder groups 310, 320, with a fuel injection valve being arranged in each of the intake branch pipes, but an illustration of these parts is omitted.

Then, a merge portion of the individual exhaust branch pipes 315a of the exhaust manifold 315 connected to the first cylinder group 310 is connected to an exhaust passage 317. A first air fuel ratio sensor 311 is arranged on the exhaust passage 317 at its connection portion to the merge portion of the exhaust branch pipes 315a. In addition, a first three-way catalyst 318 is arranged on the exhaust passage 317 at the immediately downstream side of the first air fuel ratio sensor 311. Thus, the air fuel ratio of the exhaust gas flowing into the first three-way catalyst 318 is detected by the first air fuel ratio sensor 311. Moreover, a merge portion of the individual exhaust branch pipes 325a of the exhaust manifold 325 connected to the second cylinder group 320 is connected to an exhaust passage 327. A second air fuel ratio sensor 321 is arranged on the exhaust passage 327 at its connection portion to the merge portion of the exhaust branch pipes 325a. Further, a second three-way catalyst 328 is arranged on the exhaust passage 327 at the immediately downstream side of the second air fuel ratio sensor 321. Thus, the air fuel ratio of the exhaust gas flowing into the second three-way catalyst 328 is detected by the second air fuel ratio sensor 321. In other words, in the arrangement of the V type 8-cylinder gasoline engine according to this modification, the three-way catalysts 318, 328 and the air fuel ratio sensors 311, 321 are arranged in the exhaust passages 317, 327 corresponding to the cylinder groups 310, 320, respectively. In addition, in this arrangement, too, the detected values of the individual air fuel ratio sensors 311, 321 are inputted to an ECU (illustration omitted) that controls the operating state of the internal combustion engine 300, etc.

In the arrangement as shown in FIG. 20, the air fuel ratio dither control is carried out in order to raise the individual temperatures of the three-way catalysts 318, 328. For that reason, in each of the cylinder groups 310, 320, the air fuel ratio dither control is carried out by assigning a part of the cylinders as the lean cylinder, and by assigning a part of the other cylinders as the rich cylinder. Then, the air fuel ratio of a mixture in each of the lean cylinder and the rich cylinder in the first cylinder group 310 is controlled in a feedback manner based on an average value of a detected value of the first air fuel ratio sensor 311, so that an average value of an air fuel ratio of exhaust gas flowing into the first three-way catalyst 318 becomes a predetermined target exhaust gas air fuel ratio. In addition, the air fuel ratio of a mixture in each of the lean cylinder and the rich cylinder in the second cylinder group 320 is controlled in a feedback manner based on the average value of the detected value of the second air fuel ratio sensor 321, so that an average value of an air fuel ratio of exhaust gas flowing into the second three-way catalyst 328 becomes a predetermined target exhaust gas air fuel ratio.

Accordingly, the assignment of the lean cylinder and the rich cylinder at the time of carrying out the air fuel ratio dither control, as explained in each of the above-mentioned first through third embodiments, is applied to the assignment of the lean cylinder and the rich cylinder in each of the cylinder groups 310, 320. In other words, in the first cylinder group 310, a cylinder of which the gas impingement intensity of exhaust gas (i.e., the gas impingement intensity with respect to the first air fuel ratio sensor 311) among the first cylinder through the fourth cylinder is the highest is assigned to the lean cylinder, whereas in the second cylinder group 320, a cylinder of which the gas impingement intensity of exhaust gas (i.e., the gas impingement intensity with respect to the second air fuel ratio sensor 321) among the fifth cylinder through the eighth cylinder is the highest is assigned to the lean cylinder.

In addition, whether the other cylinders in each of the first and second cylinder groups 310, 320 are set as the lean cylinder or the rich cylinder at the time of carrying out the air fuel ratio dither control is decided by taking account of the combustion order (firing order) of the individual cylinders in each of the first and second cylinder groups 310, 320, the number of cylinders to be set as the lean cylinder and the number of cylinders to be set as the rich cylinder in each of the first and second cylinder groups 310, 320, in addition to the relative relation of the gas impingement intensities for individual cylinders in each of the first and second cylinder groups 310, 320. At this time, the method of definition explained in the above-mentioned first through third embodiments can be applied to a specific method of definition of the relative relation of the gas impingement intensities of exhaust gases for the individual cylinders in each of the cylinder groups 310, 320. Moreover, the way of cylinder assignment explained in the above-mentioned first through third embodiments can be applied to a specific way of assignment of the lean cylinder and the rich cylinder in each of the cylinder groups 310, 320.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An exhaust gas purification system for an internal combustion engine comprising a cylinder group including a plurality of cylinders, the system comprising:
 a three-way catalyst that is arranged in an exhaust passage at the downstream side of a merge portion of exhaust branch pipes which are connected to individual cylinders of the cylinder group;
 an air fuel ratio sensor that is arranged in a portion in the exhaust passage at the upstream side of the three-way catalyst; and
 a controller comprising at least one processor configured to control an air fuel ratio of a mixture in a part of the cylinders of the cylinder group to a lean air fuel ratio leaner than a stoichiometric air fuel ratio, and control an air fuel ratio of a mixture in a part of the other cylinders of the cylinder group to a rich air fuel ratio richer than the stoichiometric air fuel ratio, and carry out air fuel ratio dither control in which the air fuel ratio of the mixture in each of one or more lean cylinders, in which the air fuel ratio of the mixture is controlled to the lean air fuel ratio, and one or more rich cylinders, in which the air fuel ratio of the mixture is controlled to the rich air fuel ratio, is controlled in a feedback manner based on an average value of a detected value of the air fuel ratio sensor, in such a manner that an average value of an air fuel ratio of exhaust gas flowing into the three-way catalyst becomes a predetermined target exhaust gas air fuel ratio;

wherein the controller carries out the air fuel ratio dither control by setting as the one or more lean cylinders, at least a cylinder, in which a gas impingement intensity, which is an intensity of impingement of exhaust gas discharged from the cylinder against the air fuel ratio sensor, is the highest, in the cylinder group.

2. The exhaust gas purification system for an internal combustion engine according to claim 1, wherein
the controller further carries out the air fuel ratio dither control, by setting, as the one or more rich cylinders, at least a cylinder with the lowest gas impingement intensity in the cylinder group.

3. The exhaust gas purification system for an internal combustion engine according to claim 1, wherein
when the air fuel ratio dither control is carried out by setting, as the one or more lean cylinders, two or more of the plurality of cylinders in the cylinder group, the controller carries out the air fuel ratio dither control, by setting, as the one or more lean cylinders, cylinders in the cylinder group in the order of decreasing the gas impingement intensity from the highest.

4. The exhaust gas purification system for an internal combustion engine according to claim 2, wherein
when the air fuel ratio dither control is carried out by setting, as the one or more lean cylinders, two or more of the plurality of cylinders in the cylinder group, the controller carries out the air fuel ratio dither control, by setting, as the one or more lean cylinders, cylinders in the cylinder group in the order of decreasing the gas impingement intensity from the highest.

5. The exhaust gas purification system for an internal combustion engine according to claim 1, wherein
when the air fuel ratio dither control is carried out by setting, as the one or more lean cylinders, two cylinders of which the order of combustion is continuous among the plurality of cylinders in the cylinder group, the controller carries out the air fuel ratio dither control, by setting, as the one or more lean cylinders, a cylinder with the highest gas impingement intensity in the cylinder group, and another cylinder of which the combustion order is immediately before or after the cylinder with the highest gas impingement intensity and which has a higher gas impingement intensity than that of a cylinder of which the combustion order is immediately after or before the cylinder with the highest gas impingement intensity.

* * * * *